(12) United States Patent
Garvey et al.

(10) Patent No.: US 11,836,591 B1
(45) Date of Patent: *Dec. 5, 2023

(54) SCALABLE SYSTEMS AND METHODS FOR CURATING USER EXPERIENCE TEST RESULTS

(71) Applicant: WEVO, INC., Boston, MA (US)

(72) Inventors: Dustin Garvey, Exeter, NH (US); Shannon Walsh, Boston, MA (US); Nitzan Shaer, Boston, MA (US); Janet Muto, Boston, MA (US); Jon Andrews, Boston, MA (US); Frank Chiang, Boston, MA (US); Alexa Stewart, Andover, MA (US); Hannah Sieber, Mendon, MA (US); Charlie Hoang, Brighton, MA (US); Rick Alarcon Sisniegas, New York, NY (US); Alexander Barza, Cambridge, MA (US)

(73) Assignee: WEVO, INC., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/981,243

(22) Filed: Nov. 4, 2022

Related U.S. Application Data

(63) Continuation of application No. 17/963,760, filed on Oct. 11, 2022.

(51) Int. Cl.
    *G06N 20/20* (2019.01)
(52) U.S. Cl.
    CPC .................................. *G06N 20/20* (2019.01)

(58) Field of Classification Search
    CPC .. G06F 11/3664; G06F 11/3692; G06N 20/20
    USPC .......................................................... 717/125
    See application file for complete search history.

(56) References Cited

U.S. PATENT DOCUMENTS

| | | | |
|---|---|---|---|
| 8,462,996 B2 * | 6/2013 | Moon | G06V 40/20 |
| | | | 351/203 |
| 10,942,625 B1 * | 3/2021 | Li | G09G 5/14 |
| 11,250,069 B1 | 2/2022 | Bianchi et al. | |
| 2015/0095017 A1 | 4/2015 | Mnih et al. | |
| 2018/0174070 A1 | 6/2018 | Hoffman et al. | |
| 2019/0050875 A1 | 2/2019 | McCord | |
| 2020/0004564 A1 | 1/2020 | Calegari et al. | |
| 2020/0065389 A1 | 2/2020 | Lu et al. | |
| 2020/0226479 A1 | 7/2020 | Germanakos et al. | |
| 2021/0150594 A1 | 5/2021 | Zhu et al. | |
| 2021/0407312 A1 * | 12/2021 | Mestres | H04L 65/4015 |

(Continued)

OTHER PUBLICATIONS

Kang et al., "Continual Retraining of Keystroke dynamics Based Authenticator", ICB2007, pp. 1203-1211 (Year: 2007).*

*Primary Examiner* — Tsu-Chang Lee
(74) *Attorney, Agent, or Firm* — Invoke

(57) ABSTRACT

Techniques are described herein for selecting, curating, normalizing, enriching, and synthesizing the results of user experience tests. In some embodiments, a system identifies a qualitative element within a result set for a user experience test. The system then selects a machine learning model to apply based on one or more attributes associated with the user experience test and generates a predicted visibility, quality, and/or relevance for the qualitative element. Based on the prediction, the system generates a user interface that curates a set of results of the user experience test.

20 Claims, 8 Drawing Sheets

(56) References Cited

U.S. PATENT DOCUMENTS

| | | |
|---|---|---|
| 2022/0050877 A1* | 2/2022 | Kang ................. G06F 16/9027 |
| 2022/0067763 A1 | 3/2022 | Jung |
| 2022/0092651 A1 | 3/2022 | Sureshkumar et al. |
| 2022/0374597 A1* | 11/2022 | Bellegarda ............ G06F 40/242 |
| 2022/0398635 A1 | 12/2022 | Jungmeisteris et al. |
| 2023/0025371 A1 | 1/2023 | Syed et al. |
| 2023/0085195 A1 | 3/2023 | Karri et al. |

* cited by examiner

View Test Details

Info 502

| | |
|---|---|
| Test Name | Homepage_SEP2022 (Mobile) |
| Test Owner | HAL |

Goal/Hypothesis

General user perceptions, expectations and desired from homepage

| | |
|---|---|
| Metric Selected | Standard Diagnostic Scores |

Test Type 506

| | |
|---|---|
| Type | Classic |
| Device | Mobile |

Offer
Homepage of a garden tool website

Visitor Objective
Evaluating a garden tool website

Assets 508

Webpage
Homepage_URL

...

Custom Questions 510

Question:
What is the likelihood that you would purchase the product after viewing the website?

Follow-up Question:
Please describe your next step if you were trying to get to a specific shopping category

| | |
|---|---|
| Question Type | Qualitative |
| Question Scope | Selected Pages ⌄ |

...

Target Audience Criteria 504

| | |
|---|---|
| Group Type | Consumers |

| Age Segment | |
|---|---|
| 18-34 | 45% |
| 35-44 | 30% |
| 45-54 | 15% |
| 55 and older | 10% |

SCALABLE SYSTEMS AND METHODS FOR CURATING USER EXPERIENCE TEST RESULTS

INCORPORATION BY REFERENCE; DISCLAIMER

The following application is hereby incorporated by reference: application Ser. No. 17/963,760 filed on Oct. 10, 2022. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates, generally, to user experience testing. In particular, the present disclosure relates to selecting, curating, normalizing, enriching, and synthesizing the results of user experience tests.

BACKGROUND

User experience (UX) design encompasses tools and applications for optimizing how users interact with a system, which may be comprised of physical and/or digital interfaces. Component tools allow designers and researchers to compose and administer UX tests, the results of which may be processed to assess and understand user experiences with a product. For example, the component tools may allow a user to compose and administer a survey or questionnaire that prompts a sample set of users to describe and/or otherwise evaluate the user's experience with a product. A UX test may also be composed to monitor and capture various metrics associated with a user's interaction with a product, such as how long it takes the user to perform a certain task and how long a user engages with the product. Test results may include qualitative and quantitative data that provide insights into user experiences with a product. Such insights may help isolate problematic areas of a product's design and guide product design updates to improve the overall experience when using a product.

User researchers and product designers generally have two options when performing UX testing. The first is to compose and administer the tests using existing or custom-built frameworks. For example, a framework may allow users to create custom survey questions and target a panel with particular demographics. In this scenario, the researcher bears the burden of determining how the tools should be composed and how the results should be analyzed. The researcher may not have the time or expertise to effectively run UX tests and identify the highest-quality test results. Poorly crafted tests and analysis may lead to sub-optimal product design choices and the inefficient use of resources.

Researchers may also outsource UX testing to a third-party service provider. In this scenario, the service provider may use proprietary tools to perform the UX tests and analyze the results. Third-party service providers may leverage their expertise in conducting and administering tests. However, it may be difficult for service providers to identify the test results that are most relevant to the specific customer. The analysis is often decomposed into manual tasks that are tightly coupled to the specific customer. As a result, extracting useful and actionable insights is typically an expensive, cumbersome, and inefficient process.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 5 illustrates an example user interface for viewing and composing user experience tests in accordance with some embodiments;

DETAILED DESCRIPTION

Figure 1:
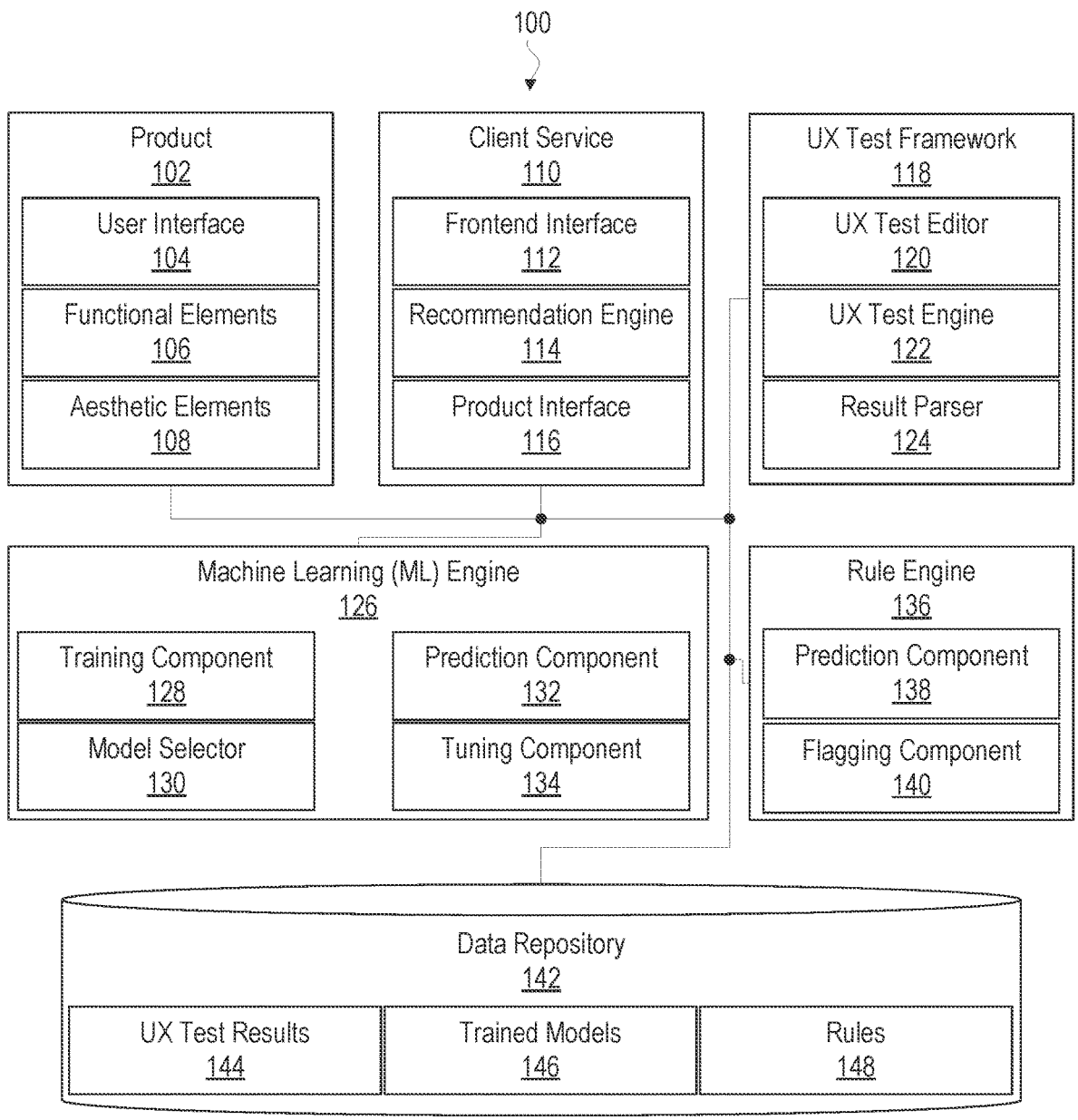
FIG. 1 illustrates a system architecture for curating qualitative user experience test results in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview

Techniques are described herein for selecting, curating, normalizing, enriching, and synthesizing the results of user experience (UX) tests. The techniques may automate one or more aspects of UX testing, increasing the scalability of UX testing systems and methodologies. The techniques may further provide insights into UX test results that are not readily apparent from the raw result data. The insights may be used to render user interfaces and/or to trigger other system actions, which may optimize product design feedback, analysis, and development process flows.

In some embodiments, a system receives a set of UX test results as input and outputs a curated set of qualitative elements. A qualitative element, as used herein, may include descriptive or conceptual evaluations with respect to one or more facets of a user experience. For example, a qualitative element may include a quotation from a respondent's response to a survey question prompting for feedback related to the user's experience. A qualitative element may include an unstructured stream of text that does not follow a pre-defined data model or structure. Such qualitative data may be wholly or partially non-numeric. The set of UX test results input into the system may also include quantitative elements, such as a numeric rating or captured metrics related to one or more facets of the user's experience. However, in other embodiments, the set of inputs may include only qualitative data.

In some embodiments, the curation process includes determining a collection of qualitative elements to include in a final set that is made visible or otherwise output to a consumer, which may be an end user or process. Conversely, the curation process may include determining a collection of results to filter, hide, or otherwise exclude. Curation may minimize the extraneous information that is presented to the end user and/or consumed by other applications. The system may automatically detect and exclude test results with low levels of information or other problematic content, which may avoid wasting the amount of processing overhead incurred by the consumer. As a result, system scalability may be increased, with faster and greater processing capabilities of UX test result data streams while enhancing the insights gleaned from the UX test results.

In some embodiments, the system includes a machine learning engine for predicting a quality and/or visibility of a qualitative element. The machine learning engine may train multiple models tailored to different user experience attributes that are tested. For example, different models may be trained depending on one or more attributes of a product, such as the industry in which the product is used, the target consumer base of the product, the product type, and/or the types of features included in the product. Additionally or alternatively, the machine learning engine may train different models for different facets of a user experiences and/or different types of survey questions within a UX test. Labeled training data may be divided and grouped along one or more such dimensions to build the set of models.

By training multiple machine learning models along different dimensions, different models may learn and extrapolate from different signals that are specific to a particular domain. For example, a set of quotation attributes that are predictive of a useful quotation for one type of user experience may not be relevant to another type of user experience. As another example, a quotation may be relevant to a particular question within a user experience test but not for another question. Thus, given the same quotation (or other qualitative data) as input, different models may predict different labels, and the data may be hidden in one instance but visible in another.

The system may use machine learning to adapt to changing conditions across different domains without requiring a developer to update the underlying system code. For example, the system may receive feedback on the quality or relevance of a particular qualitative element with respect to one or more domains. In response to the feedback, the machine learning engine may update one or more model parameters used to estimate a label for qualitative UX test results. The system may further train or retrain a model using data that is local in time such that the model "forgets" data that is older than a threshold age. Thus, the system may pick up on trending and evolving patterns as the standards and expectations for user experiences change over time.

In some embodiments, the system selects and applies one or more trained machine learning models to newly received UX test results. The system may select a model (or set of models) to apply to a given set of qualitative elements based on one or more dimensions associated with the data, the UX test, the type of user experience, and/or the product for which the UX test was conducted. Each model may output a predicted label, which may correspond to a predicted visibility, quality, or relevance of the qualitative data to a given domain.

Additionally or alternatively, the system may include a rule engine that applies a set of rules to predict the visibility of qualitative data. For example, the rule engine may parse a quotation, using natural language processing and/or keyword recognition to generate a visibility, quality, or relevance score. Additionally or alternatively, a rule engine may flag a qualitative element if predicted to include offensive content. The system may determine a final set of qualitative data to present and/or hide based on the output of one or more rule models and/or one or machine learning models.

The system may execute one or more operations based on the model predictions. Examples include rendering user interfaces, populating work queues with UX test results for further review by an administrator, generating analytics with respect to the strengths and/or weaknesses of a product's design, and/or recommending/deploying updates to a product. The techniques may reduce the turnaround time from receiving UX test results to identifying and implementing actionable insights for improving a product's design.

One or more embodiments described in this Specification and/or recited in the claims may not be included in this General Overview section.

2. System Architecture

FIG. 1 illustrates an example system architecture for curating qualitative user experience test results in accordance with some embodiments. As illustrated in FIG. 1, system architecture 100 includes product 102, client service 110, user experience (UX) test framework 118, machine learning (ML) engine 126, rule engine 136, and data repository 142. In some embodiments, system architecture 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Product 102 refers to an item or service with which users may interact. Examples include articles of manufacture, software applications, cloud computing services, websites, virtual assistants, and other computing-based systems. Product 102 includes user interface 104 for interacting with one or more users. In the context of a computing system, service, or application, user interface 104 may render user interface elements and receive input via user interface elements. Example user interfaces include a graphical user interface (GUI), a command line interface (CLI), a haptic interface, and a voice command interface. Example user interface elements include checkboxes, radio buttons, dropdown lists, list boxes, buttons, toggles, text fields, date and time selectors, command lines, sliders, pages, and forms. User interfaces for other types of products may include buttons, levers, knobs, dials, and/or other physical elements through which a user may manipulate and interact with product 102.

In some embodiments, product 102 includes functional elements 106 and aesthetic elements 108, which may affect the user experience with respect to product 102. Functional elements 106 may include user interface controls through which the user may operate product 102 and/or affect the output of product 102. Functional elements 106 may further comprise backend processes and/or systems with which a user does not directly interact, but which may affect a user's experience with product 102, such as a perceived responsiveness or quality of product 102. Aesthetic elements 108 may generally comprise nonfunctional components of product 102 including the look and feel of user interface 104 and/or other visual design elements of product 102.

UX test framework 118 includes components for composing and running UX tests. The components may include UX test editor 120, UX test engine 122, and result parser 124. A UX test may comprise applications, tools, and/or processes for evaluating the performance of various facets of one or more user experiences with product 102. For example, a UX test may comprise a survey or questionnaire. Users of a website or a mobile application may be prompted to complete the UX test to evaluate their experience with product 102, which may be the website or application itself or a separate product. If the user accepts the prompt, the user may be redirected to a webpage with a set of queries to describe and/or rank various facets of the user experience with product 102.

Additionally or alternatively, a UX test may obtain performance data for one or more UX facets using mechanisms for tracking how a user interacts with product 102. For example, scripting tags that embed executable code in a website or backend processes, such as daemons, may track and collect metrics and/or other information about user interactions with product 102. Example metrics may include how long it takes a user to first interact with a user interface element, how long it takes a user to complete a function, how long a user engages with product 102, how long it takes for pages of user interface 104 to load, which products features are most frequently accessed, and which product features are least frequently accessed.

Additionally or alternatively, a UX test may obtain information about user experiences from other data sources. For example, a web scraper may crawl one or more websites for user reviews of a product to extract information about which product features are viewed most positively, which product features are viewed most negatively, what scores have been assigned for different features of the product, and what overall product score has been assigned. Additionally or alternatively, the UX test may scrape social media sites for posts tagged with a product identifier and extract information from the posts about how users interact with the product. In yet another example, a UX test may search customer databases and/or other sources to determine what percentage of users have returned a product, submitted a customer support ticket, or submitted a product complaint. A UX test may assign scores based on the extracted information using a scoring function or machine learning, where a UX test score quantifies one or more user experiences with respect to one or more facets of the user experience. Although only one product is illustrated in FIG. 1, a given UX test may be run for several different products and several different UX tests may be run for the same product.

UX test editor 120 is a tool through which users may compose and customize UX tests. For example, UX test editor 120 may include one or more GUI elements through which a user may select predefined survey questions, input new questions, define scripts for capturing performance metrics, and/or otherwise customize test applications to evaluate user experiences with product 102. UX test editor 120 may further allow users to define parameters associated with running a UX test, such as what segment to target, what platform to use running the test, and/or other parameters controlling how the UX test is run.

UX test engine 122 runs tests defined through UX test editor 120. A UX test may include a query mechanism to prompt or search for data describing or quantifying one or more facets of a user experience. For example, UX test engine 122 may prompt a sample set of visitors to a webpage to complete a survey describing and/or ranking various facets of a user experience with product 102. As another example, UX test engine 122 may capture webpage usage metrics from the set of visitors using scripting tags and/or scrape review sites for information describing product 102, as previously described. The tests may be run in accordance with the parameters input through UX test editor 120. The results of a UX test may include qualitative elements describing the user experience and/or quantitative elements that quantify the user experience.

Result parser 124 parses the results of UX tests to extract qualitative elements from the result set. For example, result parser 124 may extract quotations or responses to survey questions about a particular facet of a user experience. Result parser 124 may further extract additional information about individual qualitative elements and/or groups of qualitative elements, including attributes about the author of a quotation, what question a quotation is responding to, and what quantitative score the respondent gave to a facet of the user experience that is described by the quotation.

ML engine 126 uses machine learning to build models based on sample UX test data. For example, ML engine 126 may train a set of ML models to predict visibility scores for quotations with respect to a user interface or portion of the user interface. Additionally or alternatively, ML engine 126 may build models for making predictions on UX test data for other contexts. Examples are described further in the sections below. ML engine 126 may include training component 128 for building the set of ML models, model selector 130 for selecting ML models to apply based on context, prediction component 132 for applying ML models to results extracted by result parser 124, and tuning component 134 to make runtime adjustments to ML models based on feedback.

Rule engine 136 performs rule-based prediction and/or flagging. For example, rule engine 136 may generate a visibility score for quotations and/or flag quotations based on pre-defined rules. Rules allow developers to hard code patterns into the system to ensure the patterns are not missed or given little weight by the machine learning processes. Rule engine 136 may comprise prediction component 138 for applying prediction rules to results extracted by result parser 124, and flagging component 140 for applying flagging rules to the results.

Data repository 142 stores and fetches data including UX test results 144, trained models 146, and rules 148. In some embodiments, data repository 142 is any type of storage unit and/or device (e.g., a file system, database, collection of tables, or any other storage mechanism) for storing data. Further, data repository 142 may include multiple different storage units and/or devices. The multiple different storage units and/or devices may or may not be of the same type or located at the same physical site. Further, data repository 142 may be implemented or executed on the same computing system as one or more other components of system architecture 100. Alternatively or additionally, data repository 142 may be implemented or executed on a computing system separate from one or more other system components. Data repository 142 may be communicatively coupled to remote components via a direct connection or via a network.

Client service 110 may comprise applications, tools and systems used by product designers and/or third-party service providers that run specialized UX tests. In some embodiments, client service 110 comprises frontend interface 112, recommendation engine 114, and product interface 116. Frontend interface 112 may comprise a user interface for presenting analytics, recommended actions, and/or other information based on the predictions. For example, frontend interface 112 may generate and render interactive charts that allow a user to compare predicted UX test scores for product 102 to performance benchmarks and view the most helpful qualitative responses to UX tests. The user may view which facets are underperforming relative to peer products, the most informative qualitative descriptions indicative of why the facets underperformed, and recommended actions to address the problems.

Recommendation engine 114 may comprise logic for generating recommendations. For example, recommendation engine 114 may determine which facets are underperforming and which solutions are predicted to improve performance with respect to the facet. Recommendation engine 114 may leverage analytics and/or machine learning to generate the recommendations. For instance, recommendation engine 114 may learn patterns within the qualitative data and UX benchmarks for various products. Recommendation engine 114 may apply a trained model to a set of qualitative responses for product 102 to recommend product updates that are predicted to improve the product's benchmark scores.

Product interface 116 may be communicatively coupled to product 102 and allow client service 110 to invoke and/or execute functions on product 102. For example, product interface 116 may include an application programming interface (API) endpoint to send requests to a software application or service to execute a requested change in the user interface. As another example, product interface 116 may invoke an editor to change a webpage associated with product 102. The requests and functions that are invoked may be directed to improving underperforming facets of product 102.

The components illustrated in FIG. 1 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

One or more components illustrated in FIG. 1, may be implemented as a cloud service or a microservice application. Tenants may subscribe to a cloud service to track UX benchmark scores of a product, view the most helpful qualitative data highlighting the product design features that excelled or underperformed, and implement recommended actions to improve the product design. Additional embodiments and examples relating to computer networks are described below in Section 6, titled Computer Networks and Cloud Networks. Additional embodiments and examples relating to computer networks are described below in Section 7, titled Microservice Applications.

3. UX Test Result Predictions 3.1 Domain-Specific Models and Rules

As previously noted, ML models and rules may predict the visibility, quality, or relevance of a qualitative element within a set of UX test results for a given context. In some embodiments, a context includes a user interface or a portion thereof for an application, and a visibility prediction may indicate whether a given qualitative element should be displayed or hidden within the user interface element. For example, a trained model may estimate a visibility score representing a likelihood that a quotation should be made visible based on patterns in the qualitative data. Some patterns, such as those indicative that the quotation is highly relevant and insightful, may increase the visibility score of a quotation. Conversely, quotations that are not relevant or insightful may have low visibility scores.

Additionally or alternatively, the training process may pick up on other signals, which may impact the visibility and/or relevancy score. For instance, the ML models may learn patterns that are indicative that a quotation is offensive and reduce the visibility of these quotations to suppress the content. The patterns may be based on the tokens, such as unigrams and/or n-grams, within a quotation, the position of the tokens relative to other tokens in the quotation, the presence/absence of frequently co-occurring tokens, the grammatical attributes associated with the tokens (e.g., what part-of-speech a token is, whether the token is a subject or object, whether the token is part of a phrase or clause, etc.), and the state at any preceding point in the sequence of tokens. Neural language models, such as transformer machine learning models and recurrent neural networks, may be trained to learn and extrapolate from such patterns present in a training dataset. Examples herein relate to training and applying bi-directional encoder representation for transformer (BERT) models. However, other types of machine learning models may also be trained and applied, depending on the particular implementation.

In some embodiments, different machine learning models may be trained for different contexts. A particular context may be defined by one or more attributes or dimensions. Example dimensions may include the industry in which products are used, the product type, the features included in a product, the target application of the product, the target consumer base of a product, the target segment of a UX test, the facets of a user experience being tested, and attributes of the questions included in a UX test. For instance, a business-to-business (B2B) model may be trained for products that are targeting enterprises, and a business-to-consumer (B2C) model may be trained for products that are targeting individual consumers. As another example, different models may be trained for different industries, product types, product applications, UX test questions, and/or along other dimensions.

When training different models, the training data may be collected, divided, or otherwise separated across one or more dimensions. For example, quotations associated with products in one industry may be separated from quotations associated with products in a different industry. As another example, quotations for products targeting businesses consumers in a particular industry may be separated from quotations for products targeting retail consumers in the same industry. In some cases, there may be overlap between the training datasets, and a quotation may be assigned to more than one group. The dimensional attributes used to group qualitative elements may vary from implementation to implementation. The separate training datasets may then be used to train different ML models, which may include transformer language models such as DistilBERT models.

Figure 2:
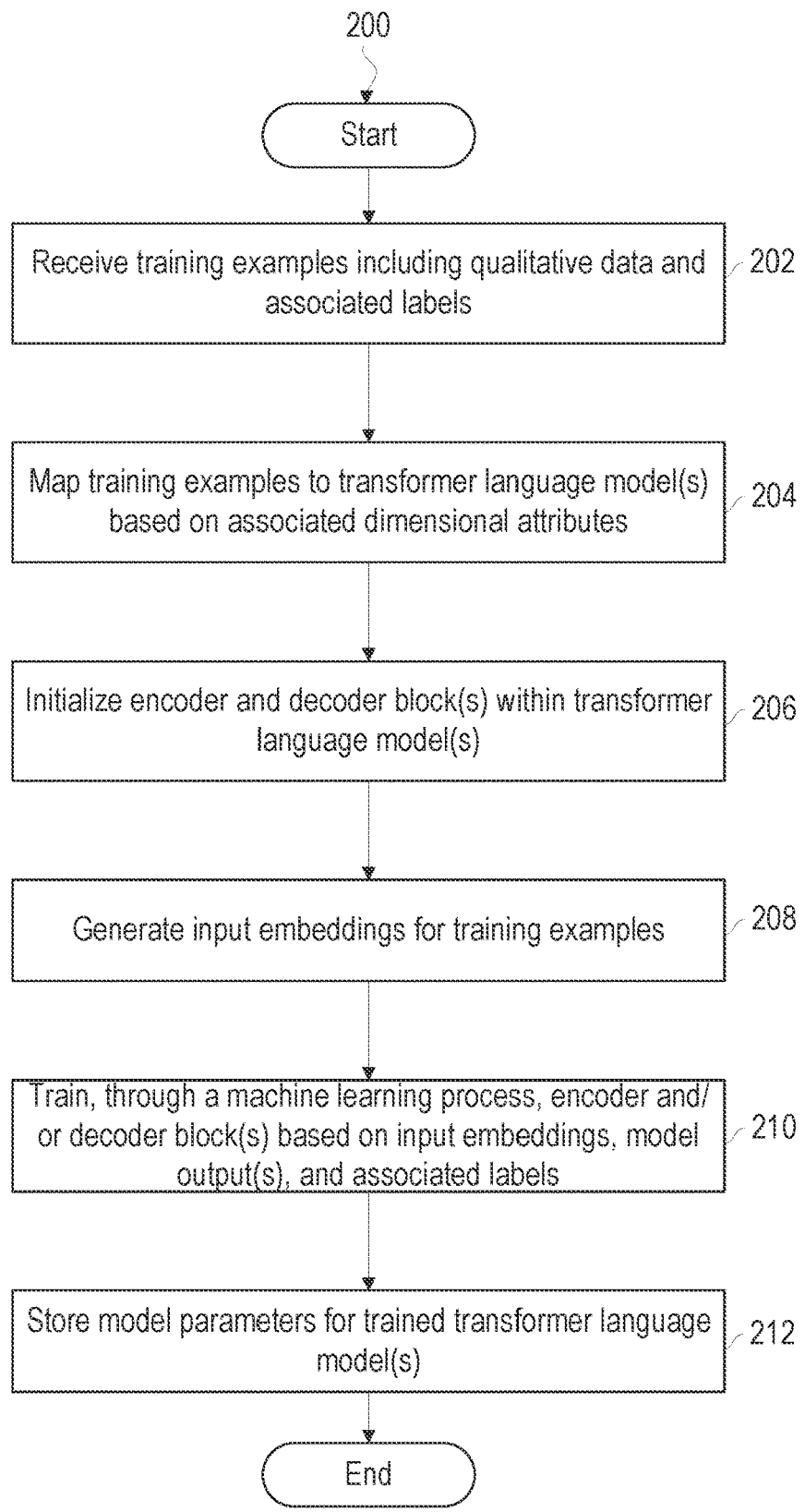
FIG. 2 illustrates a process for building a set of models that predict the visibility or relevance of qualitative elements based on training examples grouped by dimensional attributes in accordance with some embodiments.

FIG. 2 illustrates example process 200 for building a set of models that predict the visibility, quality, and/or relevance of qualitative elements based on training examples grouped by dimensional attributes in accordance with some embodiments. One or more operations illustrated in FIG. 2 may be modified, rearranged, or omitted all together. Accordingly, the particular sequence of operations illustrated in FIG. 2 should not be construed as limiting the scope of one or more embodiments.

At operation 202, process 200 receives a set of training examples including qualitative data and associated labels. In some embodiments, the qualitative data includes quotations and/or other unstructured text extracted from a set of UX test results. A label may include an indication of whether the quotation was visible or relevant to a particular context. The label may be a binary classifier (e.g., visible or hidden) or a score representing a measure/strength of the visibility, quality, and/or relevance of the quotation.

With supervised and semi-supervised learning, labels may be added or adjusted by an administrator. For example, a user may toggle which quotations are visible or hidden within a user interface. As another example, a user may input a score based on how relevant the quotation is to a particular context, such as how useful the quotation is for determining product design optimizations and the degree quality of the quotation's contents. A higher score may reflect a higher quality or relevance strength. The scoring scale may vary depending on the particular implementation.

At operation 204, process 200 maps the training examples to one or more transformer language models based on associated dimensional attributes. In some embodiments, all quotations that share a set of dimensional attributes may be mapped to one transformer while quotations with different dimensional attributes may be mapped to other models. As previously noted, the dimensional attributes that are used to separate qualitative elements may vary.

At operation 206, process 200 initializes a set of encoder and decoder blocks within the transformer models. Process 200 may randomly initialize the blocks, use configurations from pre-training, or select configurations in any other manner. Encoders may comprise multiple layers, such as a self-attention layer and a feed forward neural network. Encoders may encode a sequence of n-grams within unstructured text based on various attributes, including semantic and syntactic features of the quotations. The encoder may map the input sequence to a context or attention vector based on learned patterns. The encodings may be provided to one or more decoders, which may comprise an attention layer that provides greater weight to portions of an input sequence that are more predictive of the visibility, quality, and/or relevance of the quotation and an output layer that models the conditional probability distribution giving the probabilities that the input vector sequences are visible, high quality, or relevant.

At operation 208, process 200 generates input embeddings for the training examples. In some embodiments, process 200 generates an embedding for an example by tokenizing the quotation and converting each token into a machine learning vector according to a word embedding model such as Word2Vec. Process 200 may further add a positional encoding with each word embedding that indicates word positions within a quotation.

At operation 210, process 200 trains, through a machine learning process, the encoder and/or decoder block(s) based on the input embeddings, model output(s), and associated labels. In some embodiments, process 200 determines residuals between the transformer language model prediction output for quotations within the dataset and the label for the example. For example, process 200 may compute a difference between predicted visibility scores and an observed visibilities in the training dataset.

Based on the residuals, process 200 may then adjust the model parameters, including parameters of the encoders and/or decoders, to minimize a loss function. For instance, a model may train and tune a neural network in an encoder and/or decoder using backpropagation. Backpropagation is a process of updating cell states in the neural network based on gradients determined as a function of the estimation error. With backpropagation, nodes are assigned a fraction of the estimated error based on the contribution to the output, and the node parameters (e.g., weights, bias values) may be adjusted based on the fraction. Thus, the weights of the connections between cells of a neural network may be adjusted in an unsupervised manner. Additionally or alternatively, connections may be added and/or removed between cells based on the estimation error. The adjustments may be made to reduce and minimize the estimation error of the model. In other embodiments, the process may use other machine learning algorithms to train and tune model parameters, such as regression analysis or other methods based on gradient descent.

At operation 212, process 200 stores the model parameters for the one or more trained transformer language models. In some embodiments, process 200 stores the encoder and decoder configurations for different transformers, where each transformer is mapped to a different set of one or more dimensional attribute values. Different ML models may pick up on different patterns within the different datasets that affect the ML model predictions. For example, a particular sequence of tokens may increase the visibility score with one model but not another model. Additionally or alternatively, other patterns may impact the visibility predictions differently in different contexts. Thus, when the same quotation is fed to different ML models, the resulting predictions may vary, and the quotation may be predicted to be visible or relevant in one context but not another.

In some embodiments, the training datasets may be restricted based on age. For example, qualitative elements that are from UX test results older than a threshold age (e.g., six months, one year, etc.) may be filtered from the training dataset. Thus, training may be local in time to quickly adapt to evolving UX standards and expectations.

In some embodiments, rules may supplement ML predictions with respect to the visibility, quality, or relevance of a qualitative element. Rules may define hard coded patterns and/or formulas for computing visibility and quality scores. For example, a rule may count the number of English words and capture problematic word hits. The two values may be used to calculate a quality score such that larger English word counts produce larger quality scores, and more problematic word hits produce larger quality score penalties. A rule may include or consume a list of problematic words, which may be updated by an administrator. As another example, certain English words may be weighted differently based on semantic meanings and/or other factors. The rule may sum or otherwise aggregate the weights of different English words to compute a score, where more useful words produce large quality scores. As may be appreciated, the patterns that are encoded within a rule may vary depending on the particular implementation.

Additionally or alternatively, rules may be defined to flag qualitative elements for further review. For example, a rule may be defined to flag quotations that include certain keywords or phrases that are associated with problematic language. These rules may serve as a guardrail to ensure quotations including certain characteristics that increase the likelihood of being distracting for a product design team receive further review by a human analyst. The analyst may then make the determination of whether to hide the quotation and prevent it from being passed on to the product design team or make the quotation visible.

3.2 Curating New UX Test Results

When new UX test results are received, the results may include qualitative elements that have not previously been seen. For example, the UX test results may include quotations describing a facet of a user experience that were not included in any of the training datasets. The trained ML models may be applied to the new qualitative elements to predict the visibility, quality, and/or relevance of the quotation for a given context.

Figure 3:
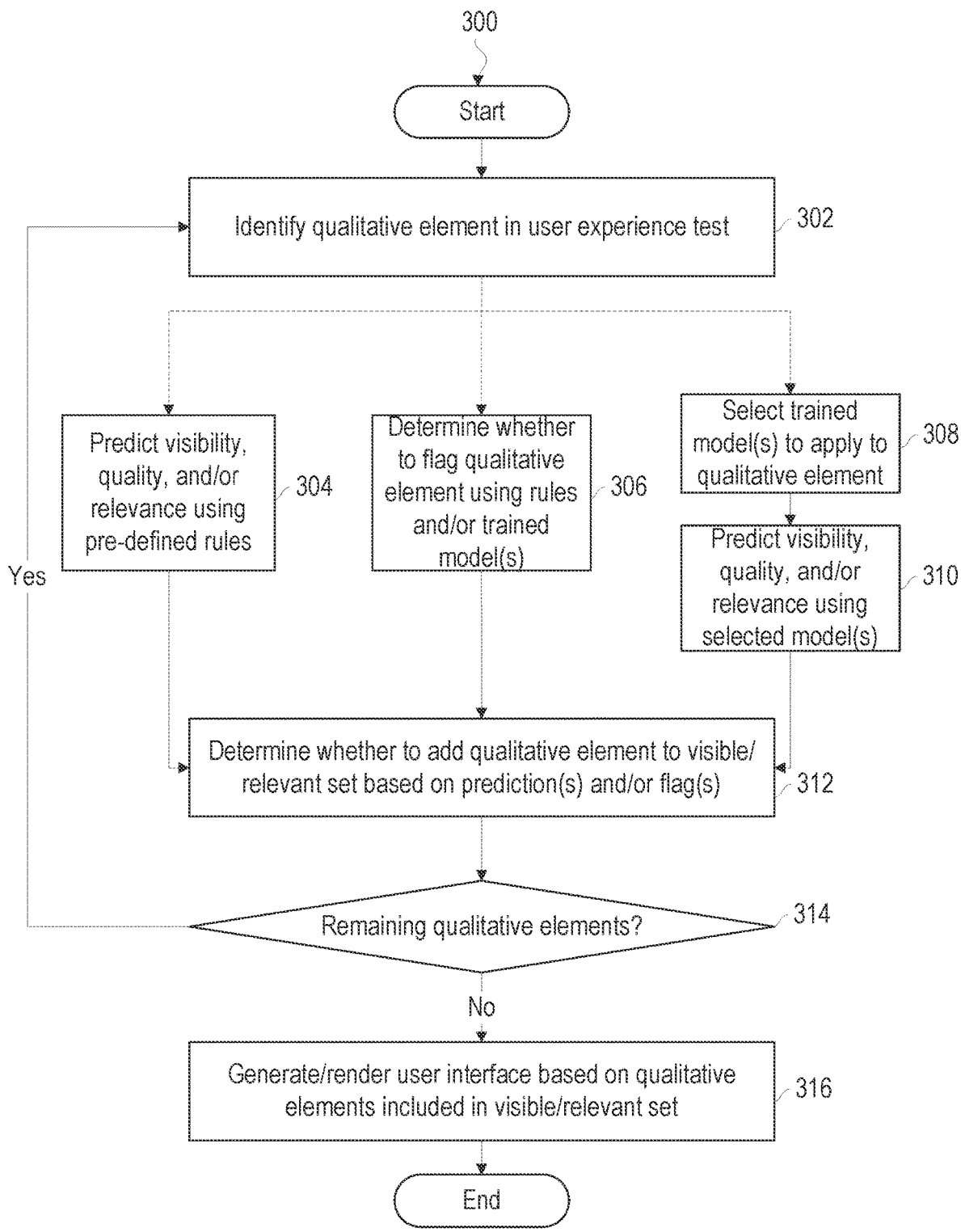
FIG. 3 illustrates a process for curating user experience (UX) test results in accordance with some embodiments.

FIG. 3 illustrates process 300 for curating UX test results in accordance with some embodiments. One or more operations illustrated in FIG. 3 may be modified, rearranged, or omitted all together. Accordingly, the particular sequence of operations illustrated in FIG. 3 should not be construed as limiting the scope of one or more embodiments.

At operation 302, process 300 identifies a qualitative element in a UX test. For example, process 300 may iterate through quotations or other unstructured text extracted from a survey that describe one or more facets of a user experience with product 102.

At operation 304, process 300 predicts the visibility, quality, and/or relevance of the qualitative element using pre-defined rules. During the operation, process 300 may compute a quality score based on the number of English words, the number of problematic words, and/or a quality weighting for each word included in the unstructured text. In some embodiments, a quality score may be mapped to a binary classifier. For example, if the quality score is greater than or equal to a threshold, then the visibility may be predicted to be true. Conversely, if the score is less than the threshold, then the visibility may be predicted to be false. In other embodiments, the quality score may be combined or otherwise aggregated with the results of the other operations described herein.

At operation 306, process 306 determines whether to flag a qualitative element using rules and/or a trained ML model. For example, process 306 may flag the quotation if it includes one or more offensive keywords or phrases as defined by a rule. As another example, process 306 may predict how offensive the quotation is using a neural language model, such as a transformer. If the quotation is predicted to include offensive content, then process 300 may flag the qualitative element for further review.

At operation 308, process 300 selects one or more trained ML models to apply to the qualitative element. In some embodiments, process 300 identifies one or more dimensional attributes associated with the qualitative element. Process 300 may determine the one or more dimensional attributes based on which UX test is being run, the product being tested, the specific UX test question to which the qualitative element is responding, and/or the respondent that submitted the question. UX test framework 118 may track these attributes during runtime as tests are conducted. Process 300 may then select an ML model that is mapped to the dimensional attributes. For example, process 300 may select a B2B model if the product or UX test is directed to sophisticated enterprise customers and a B2C model if directed to retail consumers. As another example, process 300 may select the model based on the product type, industry, survey questions, and/or other dimensional attributes previously described.

At operation 310, process 300 predicts the visibility, quality, and/or relevance of the qualitative element using the one or more selected ML models. In some embodiments, process 300 generates an ML vector for the qualitative element based on the unstructured text, such as using a word embedding and position embedding model. Process 300 may then perform a forward pass of the ML vector through the neural language model. With a transformer model, the forward pass may include feeding the ML vector through one or more encoder blocks to generate attention vectors based on learned patterns. The vector representations output by the encoders may then be fed through one or more decoder blocks to generate the prediction that the quotation is visible, high quality, and/or relevant to a particular context.

In other embodiments, other ML models may be applied to generate the prediction, including other types of neural language models. Such models may be trained using machine learning algorithms that can be iterated to learn a target model f, where the model maps a set of input variables to an output variable using a set of training data. Various types of algorithms may be used, such as linear regression, logistic regression, linear discriminant analysis, classification and regression trees, naïve Bayes, k-nearest neighbors, learning vector quantization, support vector machines, bagging and random forest walkthroughs, boosting, backpropagation, and/or clustering. The model output may include an estimated label representing a prediction on the visibility, quality, and/or relevance of the qualitative element. In some embodiments, the label is a binary classifier, such as true or false with respect to a predicted visibility. Additionally or alternatively, the output may include a probabilistic score based on the predicted strength and uncertainty of the visibility, quality, or relevance of the quotation.

At operation 312, process 300 determines whether to add the qualitative element to a visible or relevant set based on the prediction(s) and/or flags. In some embodiments, process 300 includes quotations that are predicted to be visible by both the rule-based prediction logic and the selected ML model. For instance, the quotation may be added if the rule-based quality score is above a first threshold, and the ML-based prediction is above another threshold, which may be different than the first threshold). In other embodiments, process 300 may add quotations that satisfy either threshold or may use other logic, such as averaging the scores and adding the quotation if it satisfies a combined threshold. Thus, the manner in which the ML model and rule-based outputs are combined may vary from implementation to implementation.

Additionally or alternatively, process 300 may add any quotations that were flagged for further review. In other embodiments, flagged quotations may be added to a separate set. In some cases, a quotation may be included in both the visible/relevant set and the flagged set. For instance, a quotation may be predicted to be highly visible or relevant for a given context but may include a keyword that is flagged as potentially offensive. The quotation may be presented to an analyst as predicted to be potentially useful but offensive. Alternatively, all flagged quotations may be hidden even if the predicted visibility or relevance is high.

At operation 314, process 300 determines whether there are any remaining qualitative elements to process from the UX test results. If so, then the process may iterate through operations 302 to 312 for each of the remaining qualitative elements. The result is a subset of qualitative elements that are in the visible or relevant set based on ML model and rule-based predictions. In other embodiments, the set may be built using only ML model predictions or rule-based predictions. For instance, process 300 may execute only operation 304 or operations 308 and 310 for each qualitative element.

At operation 316, process 300 generates and renders a user interface based on the qualitative elements included in the visible or relevant set. In some embodiments, the user interface includes only quotations from the set of UX test results that are included in this set or that have been flagged. The other quotations may be hidden, inaccessible, or otherwise not included in the user interface that is rendered. The rendered user interface may optimize an analyst's workflow by focusing their attention on a set of automatically curated quotations that are most likely to benefit from manual review.

3.3 Model Tuning

In some embodiments, ML model predictions and parameters may be adjusted based on a feedback loop. The feedback may include input from system administrators and/or end users viewing the predictions. For example, an analyst may adjust a visibility, quality, or relevance score of a given quotation. Additionally or alternatively, the analyst may change the distribution of which quotations are visible and which quotations are hidden. The results may be compared with predictions to determine a model estimation error. Based on the error, adjustments may be made to the model weights and/or other parameters to improve model robustness and accuracy.

Figure 4:
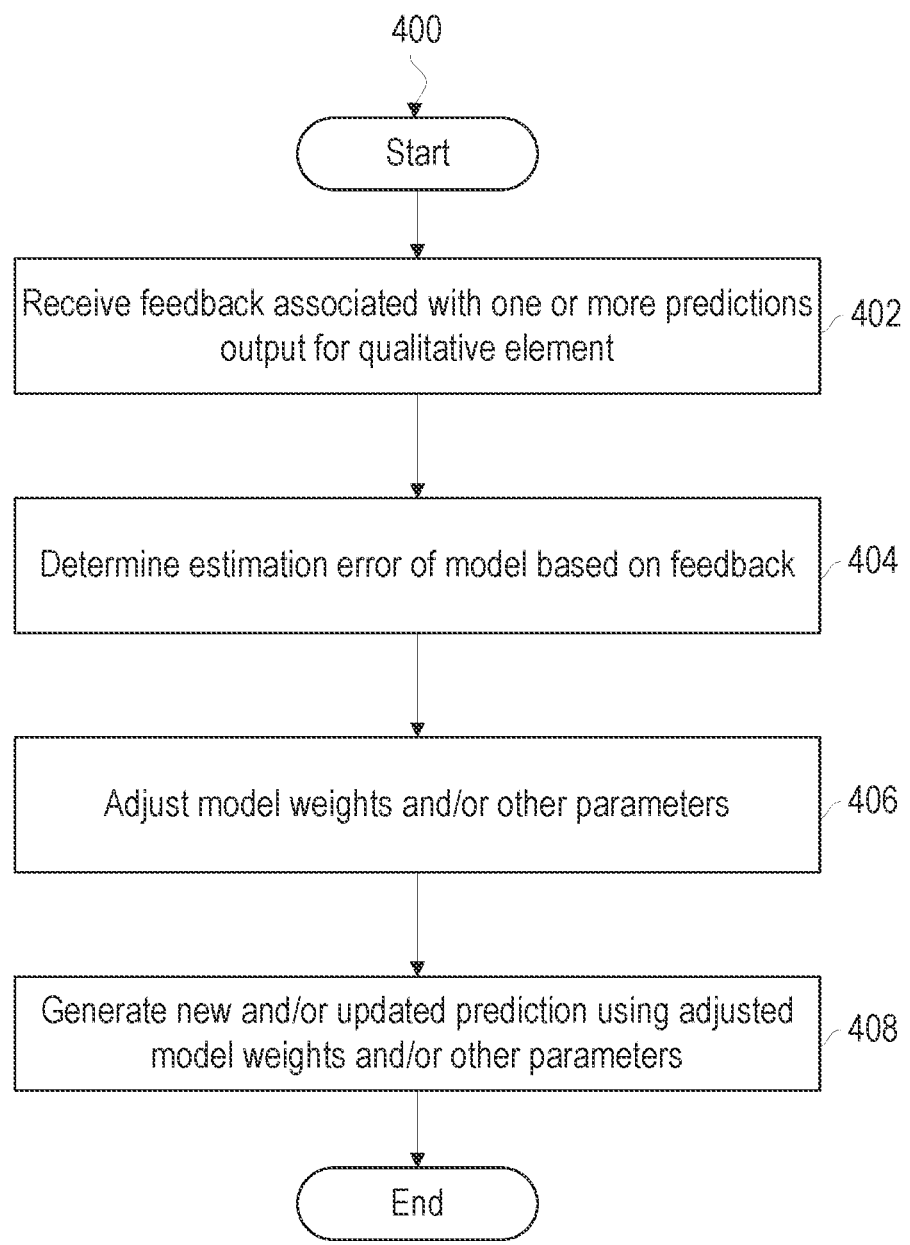
FIG. 4 illustrates a process for tuning a machine learning model based on feedback in accordance with some embodiments.

FIG. 4 illustrates process 400 for tuning a machine learning model based on feedback in accordance with some embodiments. One or more operations illustrated in FIG. 4 may be modified, rearranged, or omitted all together. Accordingly, the particular sequence of operations illustrated in FIG. 4 should not be construed as limiting the scope of one or more embodiments.

At operation 402, process 400 includes receiving feedback associated with one or more predictions output by a ML model, such as a transformer language model. In some embodiments, the feedback comprises adjustments to a visibility, quality, or relevance score. For example, an analyst may increase or decrease the score predicted for the quotation. Additionally or alternatively, the feedback may comprise an updated distribution of which qualitative elements from a set of UX test results are visible and hidden.

At operation 404, process 400 determines an estimation error of the model based on the received feedback. The estimation error may be determined by computing a difference between the adjusted and predicted value of a score. Additionally or alternatively, the estimation error may be determined based on a difference between the predicted and observed visibility distributions for set of UX test results.

At operation 406, process 400 adjusts the model weights and/or other parameters based on the estimation error. For instance, a model may train and tune a neural network using backpropagation. As previously noted, backpropagation is a process of updating cell states in the neural network based on gradients determined as a function of the estimation error. In other embodiments, the process may use other machine learning algorithms to train and tune model parameters, such as regression analysis or other methods based on gradient descent.

At operation 408, process 400 generates new and/or updated predictions using the adjusted model weights and/or other parameters. For example, cell weights within a neural network of an encoder and/or decoder block may be adjusted. Additionally or alternatively, parameters of the attention layer and/or other configurations of the various blocks may be tuned.

In some embodiments, the set of ML models may be retrained periodically to forget older data. For example, the training process depicted in FIG. 2 may be executed monthly using only UX test results that have been received within a threshold timeframe. This allows the predictions to adapt more quickly to trending and evolving standards. However, in other embodiments, the training process may use all available historical data during training. The data may be time-weighted to reduce the impact of older data on the learning process, or the data may be equally weighted.

4. Example User Interface Configurations and Optimizations

In some embodiments, the techniques described herein are included in component tools for composing and running UX tests. The techniques may be used to configure and render user interfaces in a manner that optimizes the workflow of product designers or third-party service provider analysts. In particular, the techniques may allow designers and/or analysts to quickly focus on the most high-quality test results without requiring analysts to sift through a large volume of extraneous information.

FIG. 5 illustrates example user interface 500 for viewing and composing UX tests in accordance with some embodiments. User interface 500 includes several controls to define parameters associated with a UX test. Info control 502 allows users to specify a test name, owner, and goal/hypothesis. Info control 502 further allows users to select a metric to quantify a user experience. The metrics may include predefined metric sets and/or custom defined metrics. As previously noted, metrics may be collected through prompts to the user to rate a certain facet of a user experience and/or through other collection mechanisms that track how a user interacts with product 102.

Target audience criteria control 504 allows a user to specify a target segment for a UX test. The user may specify whether the UX text targets consumers, businesses, government institutions, or some other entity. Users may further specify other segment criteria, including a distribution based on age, gender, income, and/or other attributes. When a UX test is run, the system may determine whether to prompt a user to complete the UX test based in part on whether the user matches the segment criteria. For example, the system may detect demographic information associated with a website visitor from an HTTP cookie sent from the visitor's client machine to a server. The system may compare the demographic information to the segment criteria specified in target audience criteria control. If a match is detected, then the server may send a prompt to the client's browser to complete the survey.

Test type control 506 allows a user to select different types of predefined UX tests and how the tests are administered. For example, the user may specify that the UX tests should only be run on mobile devices, desktop devices, or any network host. The user may specify details about the product for which the UX test is run and the objective with respect to the UX test. Assets control 508 allows the user to indicate a particular asset associated with a test, such as a website where they system prompts visitors to complete the UX test.

Custom questions control 510 provides an interface through which users may input additional questions to augment the standard question set in a UX test. The user may define a cascade of questions including a parent question and one or more follow-up questions that are linked. The user may further specify a question type, scope, and/or other attributes. The questions may be presented during a UX test to collect qualitative responses about product 102. The system may automatically generate the user interface for the custom questions based on predefined templates and functions to conduct the UX test based on customer parameters. For example, the system may generate one or more webpages, including input forms and/or other data entry user interface elements, to extract qualitative and/or quantitative inputs from website visitors.

Figure 6:
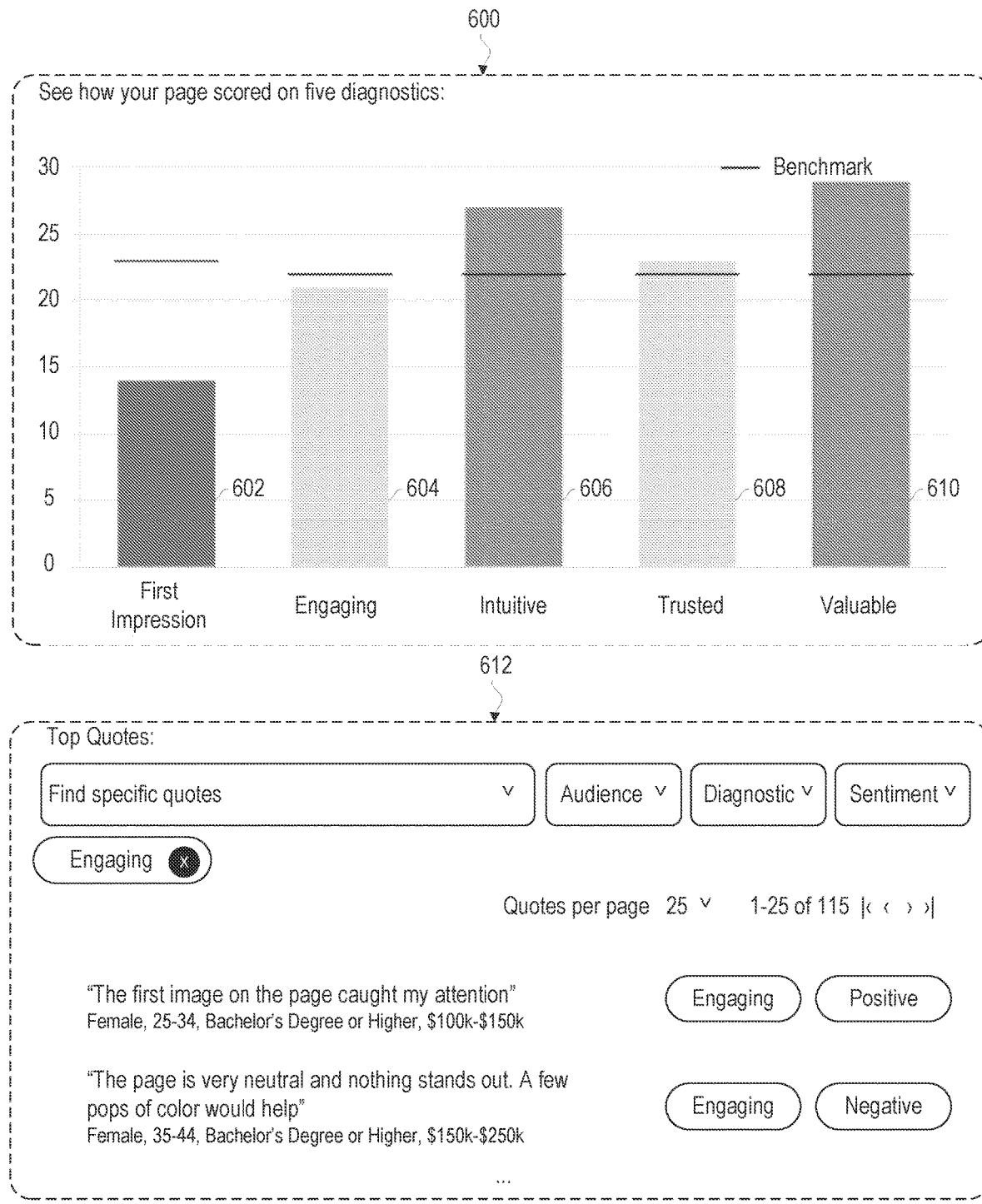
FIG. 6 illustrates an example user interface that presents a set of quantitative and qualitative results for a user experience test in accordance with some embodiments.

FIG. 6 illustrates user interface 600 that presents a set of quantitative and qualitative results for a UX test in accordance with some embodiments. User interface 600 presents a chart that is generated and rendered based on quantitative elements extracted from the UX test results. The chart is a histogram that includes bins 602, 604, 606, 608, and 610. The bins represent a performance measure of various facets of a user experience, including the first impression with the product and how engaging, intuitive, trusted, and valuable the user found the product. Industry benchmarks are also displayed to compare the performance relative to similar peer products.

Interface element 612 presents a curated set of quotations extracted from the UX test results. Interface element 612 may allow the user to search and filter the curated quotations. Example filters include an audience filter, a diagnostic filter, and a sentiment filter. Thus, the user may limit the curated quotations that are presented by segment attributes (e.g., age, gender, education, income, etc.), the facet of the user experience diagnosed by the quote (e.g., first impression, engaging, intuitive, etc.), and/or the sentiment of the quotations (e.g., positive, neutral, negative). In some embodiments, the different attributes may correspond to different dimensions and ML models. When a user selects the attributes, the system may find quotations based on the visibility, quality, and/or relevance scores output by the corresponding models. In other embodiments, the same ML model may be used across the filter criteria.

Figure 7:
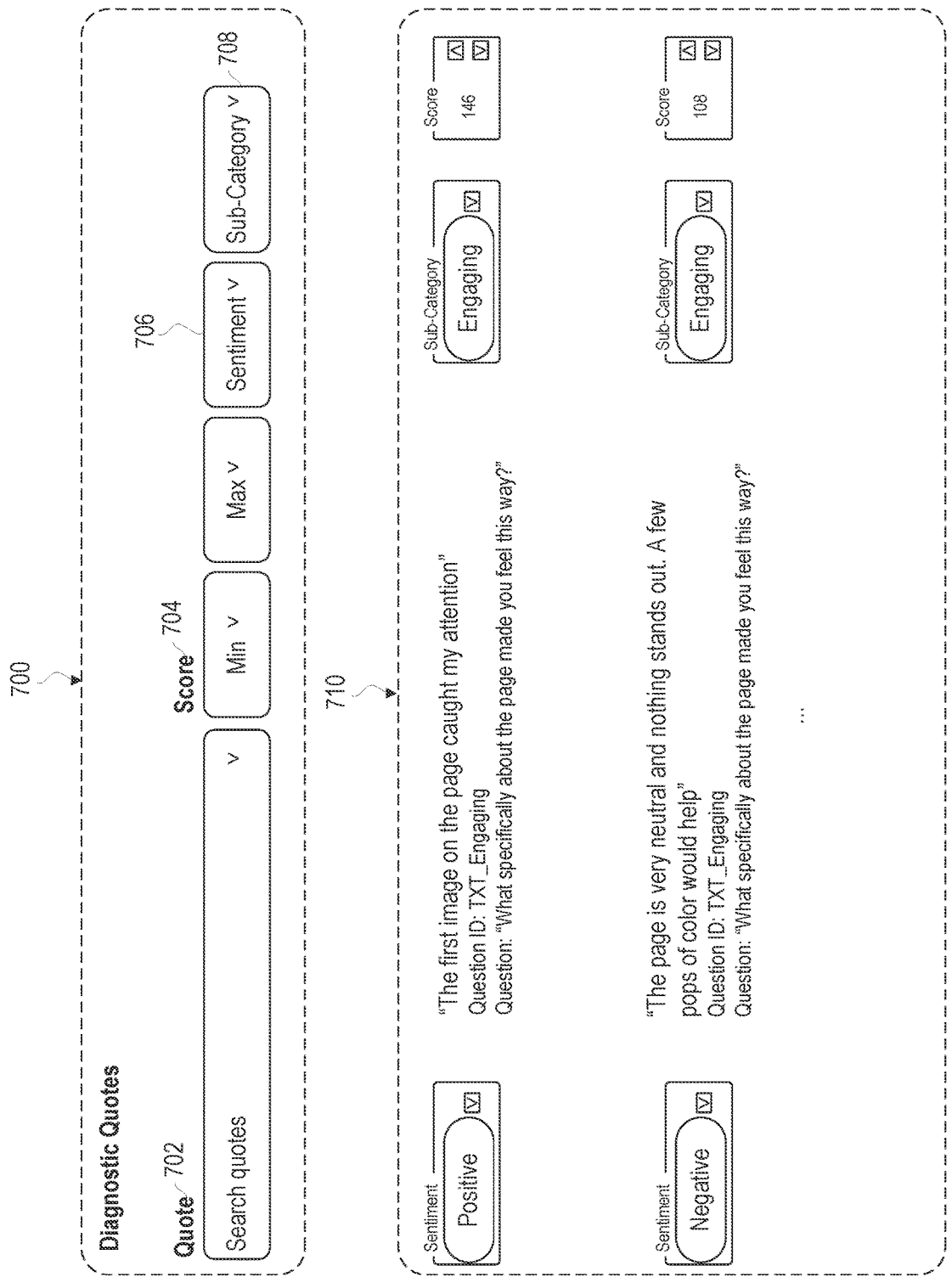
FIG. 7 illustrates an example user interface for reviewing and providing feedback on qualitative elements in accordance with some embodiments.

FIG. 7 illustrates user interface 700 for reviewing and providing feedback on qualitative elements in accordance with some embodiments. User interface 700 includes search box 702, which allows a user to search for quotations based on keywords and/or other attributes. The user may filter quotations using score filter 704, defining a minimum and/or maximum score. Quotations with scores that are outside the specified range may be hidden. Sentiment filter 706 allows the user to filter quotations based on whether the quotation expresses a positive or negative user experience. Sentiment may be inferred from a quantitative score associated with the quotation and/or through natural language processing. Sub-category filter 708 allows the user to filter quotations based on which facets of the user experience the quotations describe.

Interface element 710 presents quotations matching the filter criteria. Each quotation is presented along with a sentiment, a question identifier that uniquely identifies a question to which the quotation is responding, the text of the question, the sub-category of the question, and the visibility or relevance score. The user may use the user interface controls to adjust the score up or down, change the sub-category, or change the sentiment associated with the quotations. In response to the feedback, the system may tune and/or retrain the ML model as previously described.

5. Recommendations and Additional Applications

In some embodiments, the system may provide recommendations and/or trigger actions directed to optimizing a product based on the visible or relevant qualitative element set. The recommendations and/or actions that are triggered may vary depending on which quotations are included in the set. For instance, responsive to detecting one or more quotations such as "A few pops of color would help", recommendation engine 114 may present, via frontend interface 112, recommended changes to a color palette of a website or other product. Recommendation engine 114 may parse the result set to identify commonalities in the quotations and present the top recommended actions based on which design changes are most frequently suggested. Recommendation engine 114 may limit the analysis for commonalities to the qualitative elements in the final visible or relevant set, which may include the top n highest scored elements or only elements with a score above a threshold. By limiting the analysis to the highest quality qualitative elements, processing overhead on the system may be reduced while the overall insight quality is improved.

Additionally or alternatively, recommendation engine 114 may generate recommendations based on which peer products are predicted or observed to significantly exceed a performance benchmark. For instance, recommendation engine 114 may determine a correlation between running a web service on a particular platform and an increase in scores or more positive qualitative responses for a particular facet. Based on the determination, recommendation engine 114 may present a recommendation to migrate the service to the platform. The recommendation may indicate how the migration is predicted to improve a performance score relative to the benchmark. Additionally or alternatively, recommendation engine may recommend other actions, such as changing one or more aesthetic elements 108 and/or functional elements 106 of user interface 104, that are predicted to improve one or more target facet scores and/or qualitative responses.

Additionally or alternatively, the curated quotations may be used to compare different versions of a product. For example, the quotations with the highest visibility scores for the different products may be compared side by side. The comparison may be used to determine how user experiences were affected by the change and what additional design changes are warranted. In some cases, the interface may provide an option to rollback a change, such as by rolling back to a previous version of a website, if the system detects a significant increase in negative sentiment among the qualitative data.

Additionally or alternatively, the system may populate an analyst's work queue based on the qualitative elements from the final visible or relevant. Analysts for third-party service providers often review the results of UX tests before sending synthesized results to the product design team which hired the analysts. The ML model outputs may reduce the analyst's workload and turnaround time by hiding extraneous results. For example, an analyst may be presented with the top n highest quality results to review rather than having to manually sift through thousands of results. As previously noted, relevant results that are predicted to include offensive material may be flagged bring these results to the analyst's attention and reduce the chance that offensive results are provided by the analyst to the customer.

Additionally or alternatively, qualitative elements may be sorted and presented by score. For example, a list presented to an analyst may include quotations predicted to be the highest quality at the top with lower-quality quotes closer to the bottom. Quotations scored below a threshold may be cutoff or presented at the end of the list. Thus, quotations that provide the most helpful insights may be presented more prominently than those with little or no useful information.

Additionally or alternatively, the curated set of qualitative elements may be consumed by other downstream applications, which may process the curated results to perform additional analytics and/or trigger additional actions. For example, downstream applications may search for patterns in the curated quotations to formulate predictions, recommendations, and/or analytic insights. The applications may further execute actions based on the curated set of quotations such as updating user interface 104, functional elements 106, and/or aesthetic elements 108 in a manner that is predicted to improve the user experience test results.

6. Computer Networks and Cloud Networks

In some embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In some embodiments, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In some embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In some embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In some embodiments, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In some embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In some embodiments, in a multi-tenant computer network, tenant isolation is implemented to ensure that the applications and/or data of different tenants are not shared with each other. Various tenant isolation approaches may be used.

In some embodiments, each tenant is associated with a tenant ID. Each network resource of the multi-tenant computer network is tagged with a tenant ID. A tenant is permitted access to a particular network resource only if the tenant and the particular network resources are associated with a same tenant ID.

In some embodiments, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In some embodiments, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In some embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Microservice Applications

According to some embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using Hypertext Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In some embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to some embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In some embodiments, a plugged-in microservice application may expose actions to the microservices manager. The exposed actions may receive, as input, data or an identification of a data object or location of data, that causes data to be moved into a data cloud.

In some embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In some embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 8:
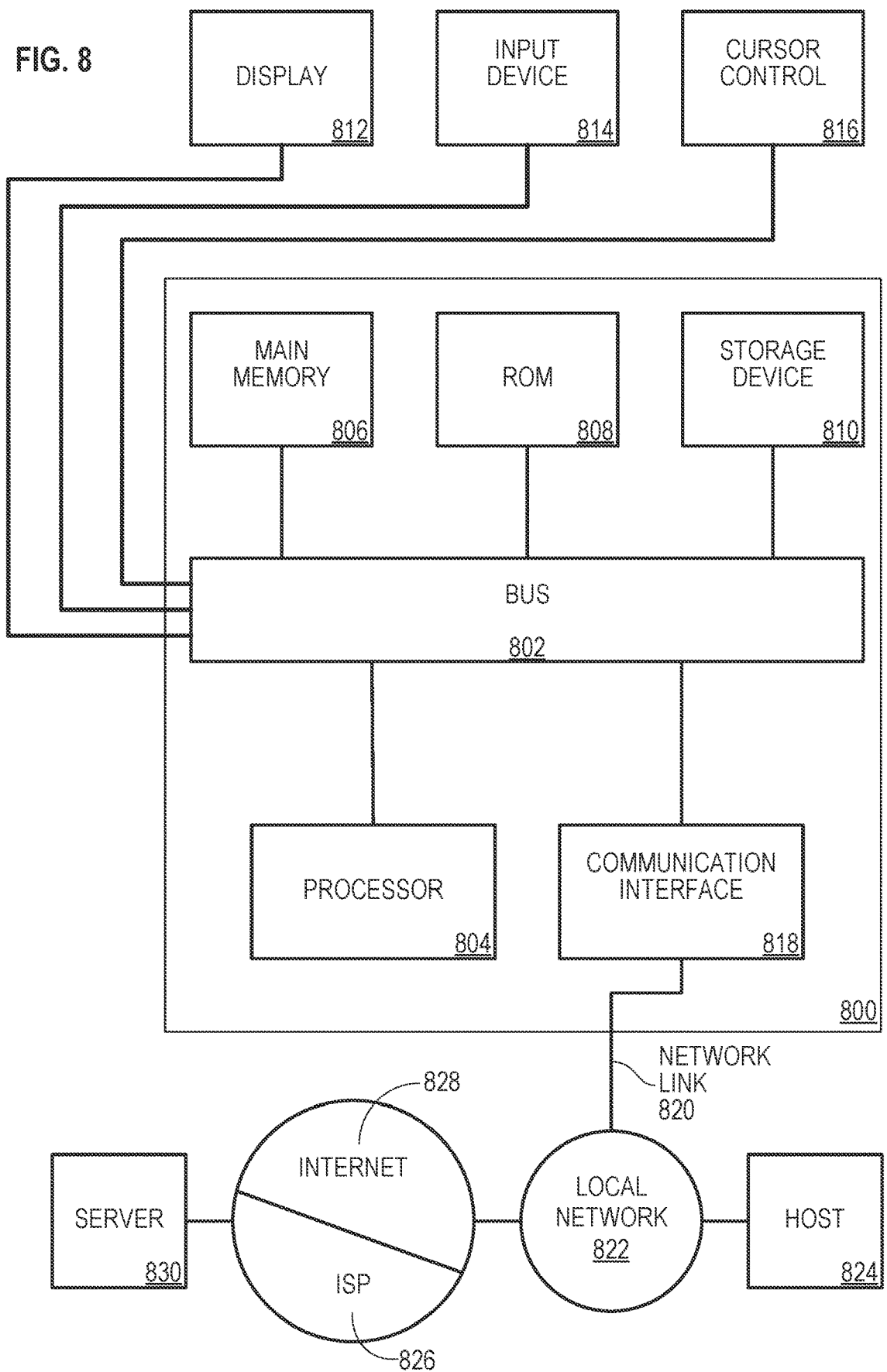
FIG. 8 illustrates a computer system in accordance with some embodiments.

For example, FIG. 8 illustrates a computer system in accordance with some embodiments. Computer system 800 includes a bus 802 or other communication mechanism for communicating information, and a hardware processor 804 coupled with bus 802 for processing information. Hardware processor 804 may be, for example, a general-purpose microprocessor.

Computer system 800 also includes a main memory 806, such as a random-access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

9. Miscellaneous; Extensions

Embodiments are directed to a system with one or more devices that include a hardware processor and that are configured to perform any of the operations described herein and/or recited in any of the claims below.

In some embodiments, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    training a plurality of machine learning models, including a plurality of transformer models, using a set of training examples to optimize at least one user interface flow associated with evaluating product designs, wherein training the plurality of learning models comprises mapping varying subsets of training examples to different transformer models based at least in part on one or more attributes associated with one or more user experience tests;
    receiving a result set for a user experience test that includes a plurality of qualitative elements providing feedback associated with a product design;
    selecting, by at least one process, at least one trained machine learning model to apply to the plurality of qualitative elements based at least in part on the one or more attributes associated with the user experience test;
    generating a set of machine learning vectors as a function of the plurality of qualitative elements;
    generating a model output to optimize the at least one user interface flow associated with evaluating product designs by performing at least one pass of the set of machine learning vectors through at least one transformer model associated with the at least one trained machine learning model that was selected, wherein the model output includes at least one of a predicted visibility, quality, or relevance of each qualitative element of the plurality of qualitative elements; and
    generating, based at least in part on at least one of the predicted visibility, quality, or relevance of each qualitative element of the plurality of qualitative elements, a user interface associated with the result set for the user experience test, wherein the user interface determines whether to include each qualitative element in a visible set of user interface elements based at least in part on at least one of the predicted visibility, quality, or relevance of the qualitative element.

2. The method of claim 1, further comprising: training a plurality of machine learning models using a set of training examples that are specific to different domains.

3. The method of claim 1, further comprising: generating, using a set of one or more rules, a second prediction for each qualitative element, wherein the user interface is further generated based at least in part on the second prediction for each qualitative element of the plurality of qualitative elements.

4. The method of claim 1, further comprising: assigning a flag to at least one qualitative element of the plurality of qualitative elements based on one or more keywords included in the at least one qualitative element, wherein the user interface is further generated based at least in part on the flag assigned to the at least one qualitative element.

5. The method of claim 1, further comprising: receiving feedback associated with the predicted visibility, quality, or relevance of the qualitative element; and responsive to receiving the feedback, tuning one or more parameters of the at least one trained machine learning model.

6. The method of claim 1, further comprising: periodically retraining the at least one machine learning model; wherein examples older than a threshold age are filtered from a training dataset used to retrain the at least one machine learning model.

7. The method of claim 1, wherein the plurality of qualitative elements includes at least one response to a survey question about a user experience; wherein the one or more attributes are determined based at least in part on the survey question.

8. The method of claim 1, wherein the one or more attributes are determined based at least in part on a target segment for the user experience test.

9. The method of claim 1, wherein the one or more attributes are determined based at least in part on a particular facet of a user experience for which the the plurality of qualitative elements were submitted.

10. One or more non-transitory computer-readable media storing instructions which, when executed by one or more hardware processors cause:
   training a plurality of machine learning models, including a plurality of transformer models, using a set of training examples to optimize at least one user interface flow associated with evaluating product designs, wherein training the plurality of learning models comprises mapping varying subsets of training examples to different transformer models based at least in part on one or more attributes associated with one or more user experience tests;
   receiving a result set for a user experience test that includes a plurality of qualitative elements providing feedback associated with a product design;
   selecting, by at least one process, at least one trained machine learning model to apply to the plurality of qualitative elements based at least in part on the one or more attributes associated with the user experience test;
   generating a set of machine learning vectors as a function of the plurality of qualitative elements;
   generating a model output to optimize the at least one user interface flow associated with evaluating product designs by performing at least one pass of the set of machine learning vectors through at least one transformer model associated with the at least one trained machine learning model that was selected, wherein the model output includes at least one of a predicted visibility, quality, or relevance of each qualitative element of the plurality of qualitative elements; and
   generating, based at least in part on at least one of the predicted visibility, quality, or relevance of each qualitative element of the plurality of qualitative elements, a user interface associated with the result set for the user experience test, wherein the user interface determines whether to include each qualitative element in a visible set of user interface elements based at least in part on at least one of the predicted visibility, quality, or relevance of the qualitative element.

11. The media of claim 10, wherein the instructions further cause: training a plurality of machine learning models using a set of training examples that are specific to different domains.

12. The media of claim 10, wherein the instructions further cause: generating, using a set of one or more rules, a second prediction for each qualitative element, wherein the user interface is further generated based at least in part on the second prediction for each qualitative element of the plurality of qualitative elements.

13. The media of claim 10, wherein the instructions further cause: assigning a flag to at least one qualitative element of the plurality of qualitative elements based on one or more keywords included in the at least one qualitative element, wherein the user interface is further generated based at least in part on the flag assigned to the at least one qualitative element.

14. The media of claim 10, wherein the instructions further cause: receiving feedback associated with the predicted visibility, quality, or relevance of the qualitative element; and responsive to receiving the feedback, tuning one or more parameters of the at least one trained machine learning model.

15. The media of claim 10, wherein the instructions further cause: periodically retraining the at least one machine learning model; wherein examples older than a threshold age are filtered from a training dataset used to retrain the at least one machine learning model.

16. The media of claim 10, wherein the plurality of qualitative elements includes at least one response to a survey question about a user experience; wherein the one or more attributes are determined based at least in part on the survey question.

17. The media of claim 10, wherein the one or more attributes are determined based at least in part on a target segment for the user experience test.

18. A system comprising:
   one or more hardware processors;
   one or more non-transitory computer-readable media storing instructions which, when executed by the one or more hardware processors cause:
      training a plurality of machine learning models, including a plurality of transformer models, using a set of training examples to optimize at least one user interface flow associated with evaluating product designs, wherein training the plurality of learning models comprises mapping varying subsets of training examples to different transformer models based at least in part on one or more attributes associated with one or more user experience tests;
      receiving a result set for a user experience test that includes a plurality of qualitative elements providing feedback associated with a product design;
      selecting, by at least one process, at least one trained machine learning model to apply to the plurality of qualitative elements based at least in part on the one or more attributes associated with the user experience test;
      generating a set of machine learning vectors as a function of the plurality of qualitative elements;
      generating a model output to optimize the at least one user interface flow associated with evaluating product designs by performing at least one pass of the set of machine learning vectors through at least one transformer model associated with the at least one trained machine learning model that was selected, wherein the model output includes at least one of a predicted visibility, quality, or relevance of each qualitative element of the plurality of qualitative elements; and generating, based at least in part on at least one of the predicted visibility, quality, or relevance of each qualitative element of the plurality of qualitative elements, a user interface associated with the result set for the user experience test, wherein the user interface determines whether to include each qualitative element in a visible set of user interface elements based at least in part on at least one of the predicted visibility, quality, or relevance of the qualitative element.

19. The method of claim 1, wherein training the plurality of machine learning models comprises: adjusting model parameters associated with at least one encoder to minimize a loss function.

20. The method of claim 1, wherein training the plurality of machine learning models comprises: adjusting model parameters associated with at least one decoder to minimize a loss function.

* * * * *